United States Patent [19]

James et al.

[11] 4,352,745

[45] Oct. 5, 1982

[54] LIQUID MOBILE PHASE

[75] Inventors: David E. James, Batavia; Richard N. Koeritz, Glen Ellyn, both of Ill.

[73] Assignee: Standard Oil Company (Indiana), Chicago, Ill.

[21] Appl. No.: 159,828

[22] Filed: Jun. 16, 1980

[51] Int. Cl.³ ............................................. B01D 15/08
[52] U.S. Cl. .................................... 252/364; 210/656; 210/659
[58] Field of Search ................. 252/364; 210/635, 656, 210/659

[56] References Cited

U.S. PATENT DOCUMENTS 3,782,075 1/1974 Kirkland ................................ 55/67
4,265,634 5/1981 Pohl ..................................... 210/656

Primary Examiner—Allan Lieberman
Attorney, Agent, or Firm—William H. Magidson; William T. McClain

[57] ABSTRACT

Aqueous solution of weak base (e.g. ammonium hydroxide) incompletely neutralized salt of an inorganic polyacid having three or more replaceable hydrogens also containing 2 to 10 weight percent dissolved alkanol or alkanenitrile buffered to a pH not exceeding 7.5 is a useful mobile phase for liquid chromatographic component separation and content determination of sample containing closely related rather polar compounds by means of a solid phase having a nitrogen-containing exchange base derived from an aminoalkyl-substituted trialkoxysilane. Such mobile phase is superior to prior suggested reverse phase made mobile phases such as 50:50 water and methanol or water and acetonitrile, or acidic aqueous solutions of strong base (e.g. sodium hydroxide) partially neutralized inorganic polyacid having at least three replaceable hydrogens.

5 Claims, No Drawings

LIQUID MOBILE PHASE

This invention relates to liquid chromatography and more specifically pertains to a novel aqueous moving phase, hence mobile phase, for carrying samples of rather polar acidic materials through a long bed of particultes of an ion exchanger whose functional site is a nitrogen-containing group having one or more replaceable hydrogens as in a primary amino ($-NH_2$) or secondary amino

($-NH$)

group preferably in a physically, mechanically or chemically bonded layer (thin to mono-molecular film) on a siliceous base. More specifically illustrative of such mechanically, physically or chemically bonded layer is an aminoalkyl-substituted trialkoxysilane (e.g., 3-aminopropyl-substituted triethoxysilane).

The novel aqueous mobile phase can provide rapid chromatographic analysis of samples of rather polar materials with rather selective retention when the nitrogen-containing layer is bonded mechanically, chemically or physically to siliceous particles or core which have the pellicular or superficially porous, or the substantially porous forms illustrated in U.S. Pat. No. 3,782,075. The bonded nitrogen-containing layer is a substantially continuous thin to mono-molecular film on such pellicular, or superficially porous, or substantially porous siliceous cores.

Such nitrogen-containing bonded layers or stationary phases are themselves relatively polar and are known to be able to function on an ion exchange mode or in a normal partitioning mode when the mobile phase is relatively non-polar wherein by an increase in the polar content of the mobile phase a reduction of sample component retention occurs. The nitrogen-containing stationary phase can function in a reversed phase separation by using a highly-polar mobile phase such as a water-methanol or water-ethanol, or water-tetrahydrofuran, or water-acetonitrile mixture. The organic component of such aqueous mobile phase can also function as a solvent for components of the sample to be analyzed and the choice of such organic solvent, vis-a-vis the sample in question, can effect component selectivity. It is also known that such water-organic solvent systems can be buffered to pH below 7 with borate or phosphate salts to permit the nitrogen-containing stationary layer to function in the ion exchange mode. Adjustment of pH, ionic strength and counterions of the aqueous mobile phase are known, in general, to affect sample retention and selectivity.

Said general characteristics of the bonded nitrogen-containing stationary phase (coated pellicular or superficially porous) form and of the mobile aqueous phases can be found in Chapters 7 to 9 "Introduction to Modern Liquid Chromatography," L. R. Snyder and J. J. Kirkland, John Wiley & Sons (1974).

STATEMENT OF THE INVENTION

The novel mobile aqueous phase of this invention is a water-soluble alkanol or alkanenitrile modified water solution of a weak base incompletely neutralized inorganic acid containing three or more replaceable hydrogens such as a mono- or di-weak base salt (e.g., ammonium salt) of such acid, as orthophosphoric acid, poly (orthophosphoric) acid and boric acid. Such solution should have a pH below 7.5. Said pH is critical not because the nitrogen-containing bonded films described above may be destroyed but because the siliceous cores onto which such films ae bonded are dissolved at pH conditions of 7.5 and higher. The water soluble alkanol or alkanenitrile should be present in a concentration not exceeding 15 weight percent, for example in a concentration of from 0.1 to 10 weight percent.

Preferably the inventive mobile aqueous phase contains from 0.05 to 5.0 molar ammonium dihydrogen phosphate and at least 0.1 but not more than 6.0 weight percent alkanenitrile, preferably acetonitrile, and has a pH of below 6, more preferably a pH between 4.0 and 5.0

The present inventive mobile phase can effect sharp, rapid separation of such closely related aromatic molecules as p-toluic acid, p-hydroxymethylbenzoic acid, 4-carboxybenzaldehyde, and terephthalic acid; aliphatic acids as acetic, butanoic and succinic acids. Also such aqueous mobile liquid provides rapid determination of rather small (0.0001 wt.%) concentrations of acetic acid in water.

In contrast, state of the art liquid chromatographic separations by long beds of small particulated nitrogen-containing ion exchanger combinations with liquid mobile fluids were relatively ineffective to useless because of unacceptably long retention of sample or its components, as well as poor to no separation of sample components and indistinctiveness of separation of one critical component. For example, in combination with a long bed of an aminoalkyl-substituted triethoxysilane bonded as thin layer to pellicular or superficially porous or substantially porous siliceous spherical cores, an aqueous mobile phase containing as little as 5 weight percent tetrahydrofuran will cause permanent irreversible loss of the bed's resolution ability.

COMPARATIVE EXAMPLES AND EXAMPLES 1 THROUGH 5

But such bed used in combination with the following indicated mobile phases had the noted effects with respect to chromatographic separation of samples of terephthalic acid (TA) contaminated with benzoic acid (BA), p-toluic acid, 4-hydroxymethylol benzoic acid (HMBA), and 4-carboxybenzaldehyde (4-CBA). Each sample was prepared by dissolving 0.1 g ($\pm 0.001$ g) in 10 milliliters of aqueous ammonium hydroxide (3.7 wt%) $NH_4OH$ to which were added 10 milliliters of internal standard solution (0.5 g benzyl alcohol, $\pm 0.0001$ gram diluted to 1.0 liter with distilled and deionized water). The solution of sample and internal standard is diluted with 60 milliliters distilled and deionized water and the pH of the final solution is adjusted to about but no higher than pH of 7.0 by the use of phosphoric acid. There ae injected 20 microliters into a 4.5 mm internal diameter $\times 250$ mm long stainless steel column packed with the above described 3-aminopropyl-substituted triethoxysilane film bonded to substantially porous siliceous cores having a diameter of 7 micrometers. TABLE I identifies the mobile phases used and the effects thereof. Such effects are determined by the use in combination of a 254 nm frequency absorbance detector and the measurement of areas under the peaks of the resulting chromatographs by a computing integrator. The last five mobile phases are Examples 1 through 5 of this invention.

Such porous microspheres for chromatographic uses are described and illustrated in U.S. Pat. No. 3,782,075. Such combination of packed chromatographic column, a system for injecting a sample under pressure and a detector system including an optically transparent flow cell connected to the output of the column is described and illustrated in U.S. Pat. No. 4,019,372.

TABLE I

EFFECT OF MOBILE PHASE COMPOSITION ON SEPARATION OF TEREPHTHALIC ACID (TA) SAMPLES

| MOBILE PHASE | EFFECT |
|---|---|
| 50 Methanol/50 Water | Some separation, long retention of TA and p-Toluic acid. |
| 50 Acetonitrile/50 Water | Good separation, very long retention of TA. |
| 0.3 M $Na_2HPO_4$/pH 4.5 | TA eluted fairly rapidly but tailed badly, only 4-CBA separated (after TA). |
| 0.4 M $Na_2HPO_4$/pH 4.5 | Same as previous with 0.3 M salt. |
| 0.2 M $Na_2HPO_4$/pH 4.5 | No separation. |
| 0.3 M $Na_2HPO_4$/pH Varied 4.0 to 6.0 | Changing pH had some effect on separation but TA still tailed badly, poor resolution, pH from 4.0–4.5 appears to be optimum. |
| 0.3 M $NH_4H_2PO_4$/pH 4.5 | Much sharper TA peak which eluted at about 15 minutes but no separation of components. |
| 0.3 M $NH_4H_2PO_4$/pH 4.5/5% methanol | Sharp TA peak; HMBA, 4-CBA, BA now eluted before TA, p-Toluic acid was not separated. |
| 0.1–0.4 M $NH_4H_2PO_4$/pH 3 to 6/2 to 15% methanol | Best resolution and sharpest TA peak with 0.25 M/pH 4.5/10% $CH_3OH$ but still no separation of p-Toluic acid. |
| 0.25 M $NH_4H_2PO_4$/pH 4.5/10% acetonitrile | Same separation as previous with 10% methanol. |
| 0.25 M $NH_4H_2PO_4$/pH 4.5/5% acetonitrile | TA sharp, all peaks HMBA, 4-CBA, TA, p-Toluic acid separated and eluded before TA. |
| 0.25 M $NH_4H_2PO_4$/pH 4.25/3% acetonitrile | Gives optimum separation. |

The last five mobile phases described in TABLE I are examples of the novel aqueous mobile phase of this invention.

From the effects noted in TABLE I it will be observed that reverse phase mode results were not acceptable. The use of an inorganic buffer gives useful, acceptable results provided the buffer has the proper cation. The importance of the cation is developed in the following consideration.

Chromatographic separation is the result of specific interactions between molecules in the material being analyzed and the stationary and moving phases. Such interactions are present in liquid phase but absent in gas phase chromatography. Such interaction can provide a powerful variable for control and improvement of separation of the molecules in the material to be analyzed. Once the column packing and method of sample preparation are chosen, then the development of an efficient, accurate, reproducible separation involves defining the effects of various mobile phase compositions.

TABLE I exemplifies such a development leading to the present inventive mobile phase by the use of terephthalic acid contaminated with partial oxidation products as above indicated. The aminoalkyl-substituted triethoxysilane bonded to pellicular or superficially porous siliceous core particles and 0.1 gram of such impure terephthalic acid dissolved in dilute aqueous ammonium hydroxide were, respectively, the column and sample preparation chosen. Separation is initially attempted by use of the reverse phase mode with the 50:50 mixtures of methanol and water or water and acetonitrile. The resuls were encouraging but unacceptable.

Then inorganic buffers were tried. The cation of the buffer proved to be important as terephthalic acid separation tailed badly when using disodium acid phosphate buffered solution. Separation of terephthalic acid became very sharp when the solution was buffered with ammonium diacid phosphate ($NH_4H_2PO_4$) but the separation was still not complete. The separation became complete and sharp when a small amount, 3 to 5 weight percent, of an organic modifier was used with the ammonium dihydrogen phosphate buffer. The sharpness of separation and complete ellution of impurity components were effected when the organic modifier was acetonitrile used in combination with ammonium dihydrogen phosphate. But even with such organic modified buffered aqueous solution separation of the component of impure terephalic acid in the order (first to last) of p-hydroxymethylbenzoic acid, 4-carboxybenzaldehyde, benzoic acid, p-toluic acid, and terephthalic acid is very sensitive to the composition and properties of the mobile phase. Separation of all of the components in said order is not accomplished until the ammonium dihydrogen phosphate molarity is at least 0.2, preferably between 0.2 and 0.3, the pH of the solution is between 4.0 and 5, preferably 4.0 to 4.5, and the acetonitrile modifier is present in amounts from 2 to 6 weight percent.

With such aqueous mobile phase, column and sample preparation, the analysis of the dry solid terephthalic acid containing the named impurities mentioned before by liquid chromatography required thirty minutes while the impurity components of main interest are detected in ten minutes. Sample preparation of the ammonium salt requires ten minutes. Thus, in a total of twenty minutes the impurity components of interest are known and in a total of fifty minutes the complete analysis has been made.

In contrast, analysis of the same type impure terephthalic acid (TA) by esterification-gas chromatography (impure TA sample esterified with methanol and mixture of esters subjected to gas chromatography) requires a total of one hour per sample. But such analysis does not have the accuracy required for determination of the most important impurity, 4-carboxybenzaldehyde, present. Thus, another portion of the sample must be subjected to polarographic analysis for more precise determination of the carboxy-aldehyde impurity. The polarographic analysis requires an additional two hours.

There are additional advantages for the use of the above defined species of the present inventive mobile fluid. One of such advantages can be demonstrated in the analysis for specification control of purified terephthalic acid obtained as a suspension in mother liquor (water, acetic acid, or mixtures thereof) containing the aforementioned impurities or reduced derivatives thereof. Such suspension, obtained as a result of recrystallization of terephthalic acid, is at least one step in its purification. Large scale commercial production of purified terephthalic acid amounts to about 900 metric tons per hour for each ten million metric tons of annual nameplate production. Separation of such slurry is generally accomplished by the use of several centrifuges. The efficiency of such separation by each centrifuge is followed by analysis of feed slurry and discharged mother liquor and by the difference between the two, and thereby the impurity content of the wet product cake is determined. Such analyses before the present invention were conducted by the before mentioned esterification-gas chromatography method. But for such analyses the samples must undergo the steps of evaporation to dryness, dissolution in caustic and esterification which, with gas chromatography, consumes up to 10 to 16 hours per pair of samples.

EXAMPLE 6

By the use of the foregoing present inventive mobile phase and its related nitrogen-containing solid phase, the —COOH containing solids and the samples are converted to their ammonium salts and the resulting solution with the benzyl alcohol internal standard and the liquid chromatographic analysis is conducted as before described. The analytical results (4-carboxybenzaldehyde and p-toluic acid content) are obtained in about 15 minutes. Thus, the malfunction of one centrifuge can be promptly detected before any material contamination of the total product occurs. However, by the use of the long, time-consuming 10 to 16 hour esterification-gas chromatography combination analysis, gross contamination of the purified product can go undetected, and the contaminated product must be returned for rerun through at least the recrystallization step preceding the separation of the slurry.

In the manufacture of acetic acid or in its recovery from its use as a reaction medium or solvent, for example in oxidation processes, it is necessary to remove water from the acetic acid by distillation. Although the low boiling fraction removal is mainly water and is generally discarded, it is an economic as well as environmental necessity to monitor the acetic acid in said fraction to be discarded. The amount of acetic acid in such aqueous discard should be, for economic and environmental protection purposes, kept at a minimum.

EXAMPLE 7

Such dilute acetic acid solutions can be quickly analyzed, in 3 to 5 minutes without any sample pre-preparation, by liquid chromatography using the nitrogen-containing solid phase (amino-alkyl-substituted triethoxysilane bonded to a pellicular or superficially porous siliceous core) and the present inventive mobile phase. For such dilute acetic acid solutions, i.e., acetic acid in concentrations of from 1.0 weight part per $1 \times 10^6$ weight parts of solution up to 2 to 5 weight percent acetic acid, the mobile phase comprises 0.125 M ammonium dihydrogen phosphate, 0.5 weight percent acetonitrile and has a pH of 4.25.

EXAMPLE 8

The 0.125 M ammonium dihydrogen phosphate, 0.5 weight percent acetonitrile and 4.25 pH mobile fluid can also be used for liquid chromatographic analysis of acetic acid manufactured by catalytic oxidation of butane. The sample of such acetic acid product requires the ammonium sald pre-preparation for its analysis. The resulting liquid chromatographic analysis can separate the by-products:butanoic and succinic acids, at parts per million concentrations and separate other impurities (not propionic acid) even at the parts per million level. Propionic acid is not separated, however, because it elutes under the very large acetic acid peak.

Trimellitic anhydride (TMA) is commercially prepared by oxidation of psuedocumene and dehydration of the resulting triacid:

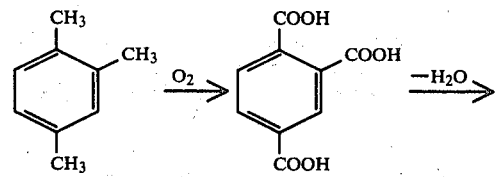

The triacid becomes a low level impurity (1-2%) in TMA. Commercial specifications require both the concentration of the anhydride and the acid be given. The current method of analysis requires hydrolysis of the anhydride to triacid followed by titration to obtain the total concentration of triacid. Next, the sample is reacted with methanol. The triacid is not affected. The anhydride ring reacts with the alcohol to produce 4-carbomethoxyisophthalic acid and 2-carbomethoxyterephthalic acid:

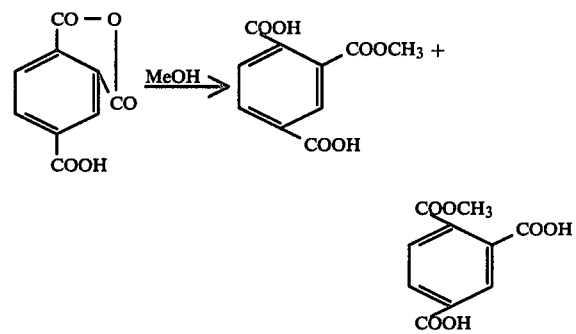

The resulting solution is thus titrated to determine the concentration of triacid. The concentration of anhydride is determined by difference. Total time for such analysis is approximately 3.5 hr.

EXAMPLE 9

The analysis for triacid and anhydride can be performed much more simply using the present inventive aqueous mobile phase and the bonded nitrogen-containing film on the siliceous cores of pellicular, superficially porous or substantially porous. Methanolysis of the TMA sample is again effected. To 100 ml of methanol containing 0.005 g of trimesic acid ($\pm 0.0001$ g) as internal standard is added 0.05 g of TMA ($\pm 0.0001$ g) sample. The mixture is then heated at the reflux temperature for 20 minutes. Upon completion, 20 microliters of the resulting solution are injected into the 4.5 mm$\times$250 mm column packed with the siliceous cores bonded to 3-aminopropyl substituted triethyloxysilane together with the aqueous mobile phase consisting of 0.25 M $NH_4H_2PO_4$/3.5% acetonitrile at pH 4.25. The eluate is monitored using a 254 nm absorbance detector. The two monoesters and the triacid are separated and their concentrations are determined from the chromatograph. The content of triacid is determined directly while the concentration of anhydride is the sum of the concentration of monoesters. Total analysis time is less than 40 minutes.

From the foregoing description and definition of the present aqueous solution inventive mobile phase and the illustrative uses of specific solution species, those skilled in this analytical art will be able to devise other aqueous solution species by the exercise of only ordinary skill rather than through extensive experimentation.

We claim:

1. An aqueous solution comprising an incompletely neutralized ammonium salt of orthophosphoric acid, poly acid or boric acid in a 0.05 to 5.0 molar concentration modified by a water soluble alkanol or alkanenitrile at a concentration of from 0.1 to 15 weight percent and buffered to a pH of from 3 to 6.

2. The aqueous solution of claim 1 wherein the modifier is 2 to 15 weight percent methanol and the solution's pH is between 3 and 6.

3. The aqueous solution of claim 1 wherein the modifier is acetonitrile, the weak base salt is ammonium dihydrogen phosphate and the solution pH is from 4 to 5.

4. The aqueous solution of claim 3 wherein the weak base ammonium dihydrogen phosphate salt is present at 0.5 to 5.0 molar concentration and the acetonitrile concentration is from 0.1 up to 6 weight percent.

5. The aqueous solution of claim 3 wherein ammonium dihydrogen phosphate concentration is 0.1 to 0.4 molar, the acetonitrile concentration is from 0.5 up to 3 weight percent and the solution's pH is between 4 and 5.

* * * * *

UNITED STATES PATENT OFFICE
CERTIFICATE OF CORRECTION

Patent No. 4,352,745            Dated October 5, 1982

Inventor(s) David E. James, Richard N. Koeritz

It is certified that error appears in the above-identified patent and that said Letters Patent are hereby corrected as shown below:

| Patent Column | Line | |
|---|---|---|
| 1 | 7-8 | "particultes" and should read --particulates-- |
| 1 | 35 | "function on" and should read --function in-- |
| 2 | 2 | "chould" and should read --should-- |
| 2 | 5 | "ae" and should read --are-- |
| 2 | 57 | "ae" and should read --are-- |
| 2 | 66 | "chromatographs" and should read --chromatograms-- |
| 4 | 10 | "resuls" and should read --results-- |
| 5 | 64 | "sald" and should read --salt-- |
| 7 | 17 | "poly acid" and should read --poly (orthophosphoric) acid-- |

Signed and Sealed this

Fourteenth Day of February 1984

[SEAL]

Attest:

GERALD J. MOSSINGHOFF

Attesting Officer     Commissioner of Patents and Trademarks